United States Patent
Shen

(10) Patent No.: US 9,434,472 B2
(45) Date of Patent: Sep. 6, 2016

(54) TRANSMISSION MECHANISM FOR REMOTE-CONTROLLED MODEL STIMULATED HELICOPTER

(71) Applicant: SHENZHEN SHEN'S TONGCHUANG AERONAUTIC MODEL CO., LTD., Shenzhen, Guangdong (CN)

(72) Inventor: Anping Shen, Shenzhen (CN)

(73) Assignee: SHENZHEN SHEN'S TONGCHUANG AERONAUTIC MODEL CO., LTD., Shenzhen, Guangdong (CN)

(*) Notice: Subject to any disclaimer, the term of this patent is extended or adjusted under 35 U.S.C. 154(b) by 909 days.

(21) Appl. No.: 13/740,247

(22) Filed: Jan. 13, 2013

(65) Prior Publication Data
US 2014/0079549 A1 Mar. 20, 2014

(30) Foreign Application Priority Data
Sep. 18, 2012 (CN) .................. 2012 2 0476048 U

(51) Int. Cl.
| | | |
|---|---|---|
| B64D 35/00 | (2006.01) |
| B64C 27/52 | (2006.01) |
| A63H 27/133 | (2006.01) |
| A63H 31/08 | (2006.01) |
| A63H 27/00 | (2006.01) |

(52) U.S. Cl.
CPC ............... B64C 27/52 (2013.01); A63H 27/12 (2013.01); A63H 31/08 (2013.01)

(58) Field of Classification Search
CPC ....... B64C 27/12; B64C 27/14; B64C 27/52; B64C 11/32; A63H 27/12; A63H 31/08
USPC .......................................................... 244/60
See application file for complete search history.

(56) References Cited

U.S. PATENT DOCUMENTS

| | | | | |
|---|---|---|---|---|
| 3,118,504 | A * | 1/1964 | Cresap ................... | B64C 27/52 244/17.25 |
| 6,065,718 | A * | 5/2000 | Piasecki ................. | B64C 27/08 244/17.11 |
| 2010/0178836 | A1* | 7/2010 | Huang .................... | A63H 27/12 446/37 |
| 2012/0156033 | A1* | 6/2012 | Cowles .................. | B64C 27/10 416/1 |
| 2012/0231695 | A1* | 9/2012 | Tu .......................... | A63H 27/12 446/36 |

* cited by examiner

*Primary Examiner* — Marc Burgess
(74) *Attorney, Agent, or Firm* — Raymond Y. Chan; David and Raymond Patent Firm

(57) ABSTRACT

A transmission mechanism for a remote-controlled model simulation helicopter includes a body frame which is orderly provided with a main rotor holder, a main rotor shaft, and a main reduction gear provided with a plurality of washout holes which are evenly distributed about an axis thereof. The body frame is provided with a swashplate module and a servo arrangement at a middle portion thereof. Since the main reduction gear is provided with washout holes and the introduction of internally installed swashplate module together with taking advantage of self structural features of the body frame, it enables the elimination of the commonly used swashplate guide board. The servo devices are provided in a same plane within the body frame and provide a triangular configuration, so that the structure is reasonable and the transmittance of motion is stable.

4 Claims, 4 Drawing Sheets

TRANSMISSION MECHANISM FOR REMOTE-CONTROLLED MODEL STIMULATED HELICOPTER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a transmission mechanism, and more particularly a transmission mechanism for a remote-controlled model simulation helicopter.

2. Description of Related Arts

A main reduction gear of a conventional remote-controlled model helicopter, which is provided in the middle of a body module at an end of a main rotor shaft, has weak stability and performs only one function which is transferring power. A swashplate module is usually provided on the main rotor shaft above the body frame, and thus an additional swashplate guide board is required for restricting unwanted radial movement of the outer tray of the swashplate. A washout device for ensuring the synchronous rotation of an inner tray of the swashplate and a main rotor is also needed. The number of exposed parts is relatively large and the simulation character of the model helicopter is destructed.

SUMMARY OF THE PRESENT INVENTION

The technical problem to be solved by the invention is to provide a transmission mechanism for a remote-controlled model simulation helicopter which simplifies the structure, reduces numbers of exposing components, and makes the appearance of the model helicopter seem more like a real helicopter.

Additional advantages and features of the invention will become apparent from the description which follows, and may be realized by means of the instrumentalities and combinations particular point out in the appended claims.

According to the present invention, the foregoing and other objects and advantages are attained by a transmission mechanism for a remote-controlled model simulation helicopter, comprising a body frame, wherein the body frame is orderly provided with a main rotor holder, a main rotor shaft, and a main reduction gear; wherein the main reduction gear is provided with a plurality of even distributed washout holes about an axis thereof, wherein the body frame is provided with a swashplate module and a servo arrangement at a middle portion thereof.

The swashplate module of the present invention comprises an outer tray and an inner tray, wherein the outer tray of the swashplate module is provided with three outer ball heads which are triangularly distributed, wherein the inner tray of the swashplate module is provided with four symmetrically distributed inner ball heads.

The servo arrangement of the present invention comprises a first servo, a second servo, and a third servo which are arranged in a same plane and are triangularly distributed.

The body frame of the present invention is respectively provided with at least one double-hole metal pull rod, at least one double-hole plastic connecting rod, and at least one servo rocker arm.

The main reduction gear of the present invention is provided with at least one bolt hole and a central hole, wherein the main rotor shaft is provided with at least one through hole, wherein the main rotor shaft passes through the central hole of the main reduction gear, wherein the transmission mechanism further comprises a retaining bolt which mounts the main rotor gear with the main rotor shaft through the bolt hole and the through hole.

The main reduction gear of the present invention further comprises a cylindrical wall that is engaged with an inner surface of a bearing, wherein the main rotor shaft is engaged below with the bearing so that a radial location of the main rotor shaft and the main reduction gear on the body frame is achieved, wherein the cylindrical wall further comprises a stepped surface that is engaged with an upper end surface of the bearing, wherein the transmission mechanism further comprises four bolt columns provided below the main reduction gear and at least one self-taping screw, wherein the self-taping screw is firmly locked so as to retain the main reduction gear on the body frame so that an axial location of the aid main rotor shaft and the main reduction gear on the body frame is achieved.

The swashplate module of the present invention is provided at a lower end of the main rotor shaft within the body frame, wherein the outer ball heads on the outer tray of the swashplate module are respectively coupled with the first servo, the second servo, and the third servo which are triangularly distributed; wherein the double plastic connecting rod has two ball head holds which are respectively engaged with a rocker arm ball head of the servo rocker arm and the outer ball head on the outer tray of the swashplate module, wherein the double-hole metal pull rod comprises a metal pull rod portion passing through the washout holes of the main reduction gear, a lower connecting rod head connected to the inner ball head of the inner tray of the swashplate module, and an upper connecting rod head connected to a ball head of the main rotor holder.

The transmission mechanism of the present invention further has a recess formed between the second servo and the third servo, wherein the swashplate module further comprises a guide rod installed into the recess.

In comparison with the conventional art, according to the present invention the main reduction gear is provided above the body frame, an upper side thereof is provided with a plastic retaining base for taking the place of a commonly used metal retaining ring and restricting the upward and downward movement of the main reduction gear. The main reduction gear has four washout holes in a middle portion thereof allowing upward and downward movement of the double-hole metal pull rod, so as to replace the commonly used washout device. The present invention further comprises the cylindrical stepped wall which is engaged with the bearing arranged for a locating function, so that the radial locating accuracy of the main reduction gear is enhanced. At the same time, the introduction of an internally installed swashplate module takes advantage of the self structural features of the body frame and enables the elimination of the commonly used swashplate guide board. The servo devices are provided in a same plane within the body frame and provide a triangular configuration, so that the structure is reasonable and the transmittance of motion is stable.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 4-1 is a front view of the transmission mechanism for a remote-controlled model simulation helicopter illustrating the main reduction gear of the preferred embodiment of the present invention.

FIG. 4-2 is a rear view of the transmission mechanism for a remote-controlled model simulation helicopter illustrating the main reduction gear of the preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
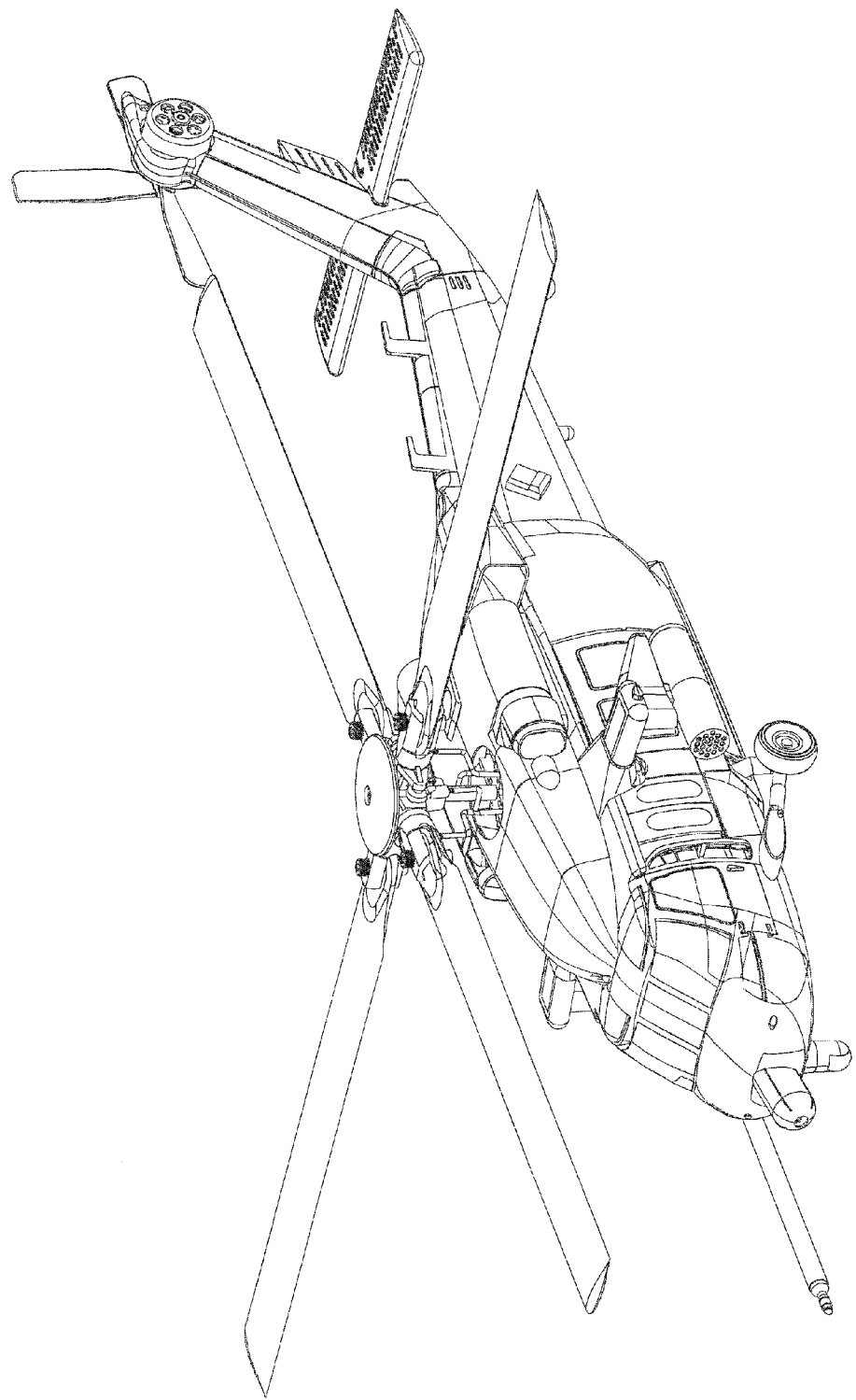
FIG. 1 is a perspective view of the transmission mechanism for a remote-controlled model simulation helicopter according to a preferred embodiment of the present invention.
Figure 2:
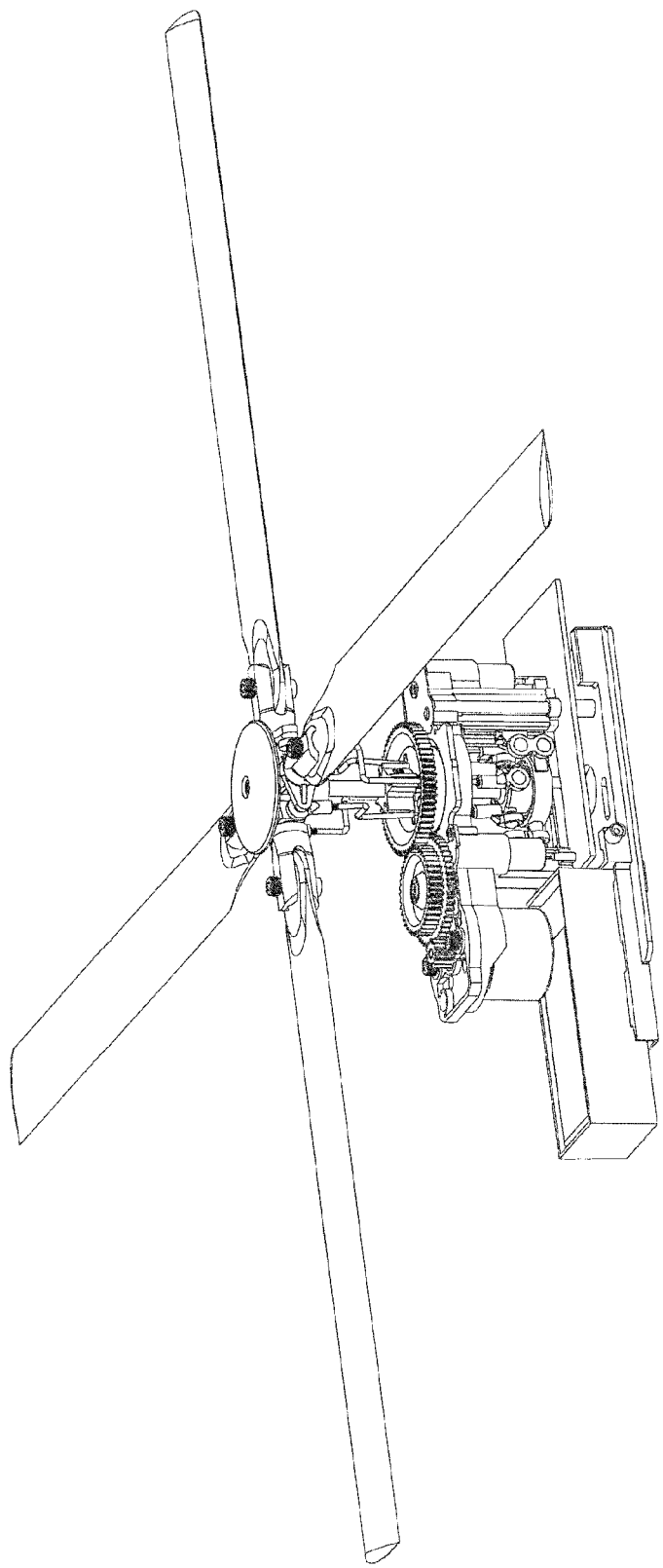
FIG. 2 is a schematic view of the transmission mechanism for a remote-controlled model simulation helicopter illustrating the preferred embodiment of the present invention in an assembled state.
Figure 3:
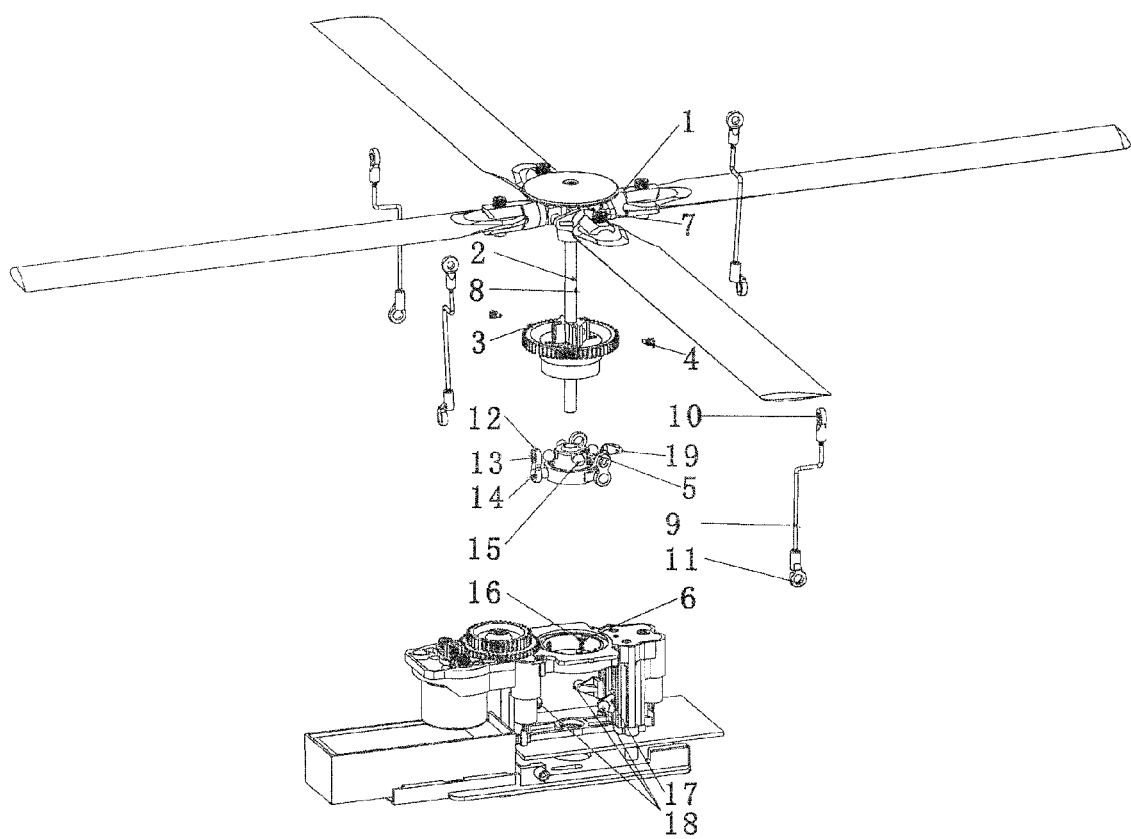
FIG. 3 is an exploded view of the transmission mechanism for a remote-controlled model simulation helicopter illustrating a main reduction gear and a tipping plate module of the preferred embodiment of the present invention.

Referring to FIG. 3 of the drawings, a transmission mechanism for a remote-controlled model simulation helicopter of the present invention comprises: a main rotor holder 1, a main rotor shaft 2, a main reduction gear 3, at least one retaining bolt 4, a swashplate module 5, at least one self-taping screw 6, a double-hole metal pull rod 9, a double-hole plastic connecting rod 12, and at least one servo rocker arm 17. An outer tray of the swashplate module 5 is provided with three outer ball heads 14 which are triangularly distributed. An inner tray of the swashplate 5 is provided with four symmetrically distributed inner ball heads 15.

Figures 1, 2, 4:
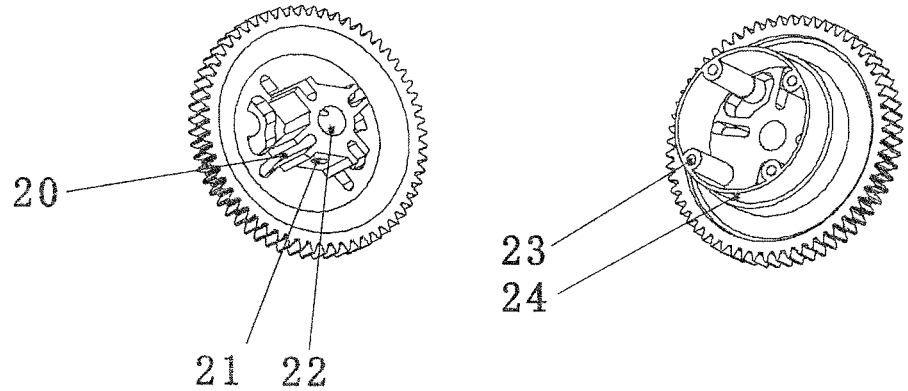

As shown in FIG. 4 of the drawings, the main reduction gear 3 has a plurality of washout holes 20 evenly distributed about an axis thereof. According to this preferred embodiment of the present invention, the main reduction gear 3 is provided with four washout holes 20, at least one bolt hole 21, a central hole 22, at least one bolt column 23, and a cylindrical wall 24 with steps.

Figure 5:
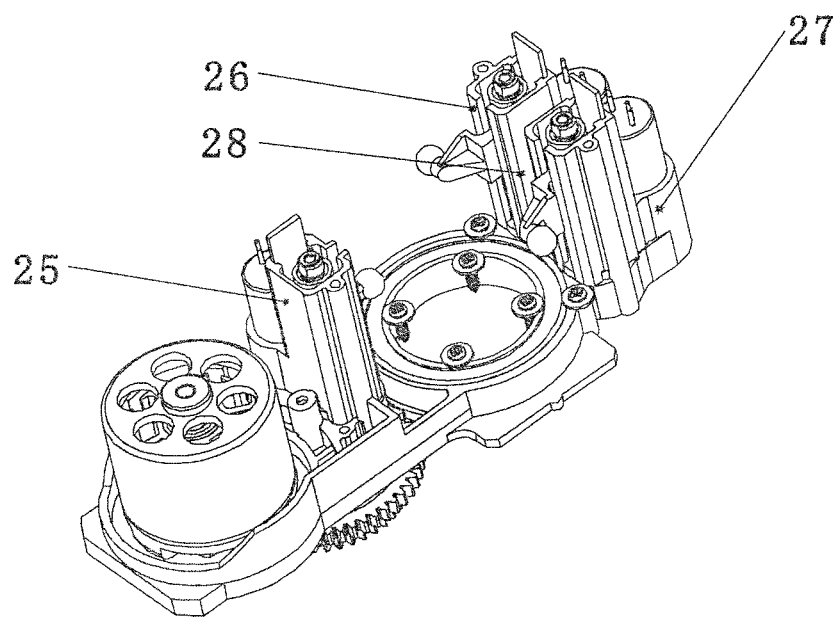
FIG. 5 is a schematic view of the transmission mechanism for a remote-controlled model simulation helicopter illustrating a layout of a servo of a body frame of the preferred embodiment of the present invention.

Referring to FIG. 5 of the drawings, a servo arrangement on a body frame comprises a first servo 25, a second servo 26, and a third servo 27 which are in the same plane and are triangularly distributed. The servo rocker arm 17 is also in this same plane. A recess 28 is formed between the second servo 26 and the third servo 27.

The main reduction gear 3 of the present invention is provided above the body frame. The main reduction gear 3 is provided with the central hole 22, the washout holes 20, the bolt holes 21, the bolt columns 23, and the cylindrical wall 24 with steps. A cylindrical surface of the cylindrical wall 24 is engaged with inner surface 16 of a bearing. A stepped surface of the cylindrical wall 24 is engaged with an upper end surface of the bearing. The main rotor shaft 2 passes through central hole 22. The retaining bolt 4 is locked into a through hole 8 of the main rotor shaft 2 through the bolt holes 21 of the main reduction gear 3 so as to mount the main rotor gear 3 with the main rotor shaft 2. The self-taping screw 6 is locked into the bolt column 23 so as to mount the main reduction gear 3 on the body frame, so that axial and radial locating of the main reduction gear 3 is achieved; therefore, a commonly used meal retaining ring is eliminated.

The swashplate module 5 of the present invention is provided at a lower end of the main rotor shaft 2 within the body frame. One ball head hole 13 at the top side of the double-hole plastic connecting rod 12 is engaged with a rocker arm ball head 18 of the servo rocker arm 17, and the other ball head hole at the bottom side thereof is engaged with an outer ball head 14 of the outer tray of the swashplate module 5. A guide rod 19 is installed in the recess 28 formed between the second servo 26 and the third servo 27 so as to restrict the unwanted radial movement of the outer tray of the swashplate, thus the commonly used swashplate guide board is replaced. At least one metal pull rod of the double-hole metal pull rod 9 passes through the washout holes 20 of the main reduction gear 3. An upper plastic connecting rod head 10 and a lower plastic connecting rod head 11 are respectively provided at an upper side and a lower side of the main reduction gear 3. The lower connecting rod head 11 is connected to an inner ball head 15 of the inner tray of the swashplate module 5. The upper connecting rod head 10 is connected to a ball head 7 of the main rotor holder 1 in such a manner that the double-hole metal pull rod 9 is capable of successfully delivering a torque to the main rotor holder 1 along the washout holes 20.

According to a command received from a transmitter; the first servo 25, the second servo 26, and the third servo 27 activate respective servo rocker arms 27 to move linearly upward or downward along a sliding groove so as to generate a command of mixed screw pitch, so as to transmit motion to the respective outer ball heads 14 of the outer tray of the swashplate module 5 via the three double-hole plastic connecting rods 12 which are connected to the rocker arms 18 of the servo rocker arms. The outer tray of the swashplate module 5 is deviated from an initial horizontal position to perform corresponding postures. The outer tray of the swashplate module 5 activates the inner tray of the swashplate module 5. The inner tray of the swashplate module 5 transmits the motion to the main rotor holder 1 via the four double-hole metal pull rods 9. Finally, the command of mixed screw pitch is manifested through the changes of the rotating postures of the main rotor, so that the model helicopter performs corresponding actions to finish an action command.

Simultaneously, the washout holes 20 drive the double-hole metal pull rods 9 and the main reduction gear 3 to synchronously rotate, while the main rotor holder 1 and the inner tray of the swashplate module 5, which are respectively connected to two ends of each of the double-hole metal pull rods 9, keep synchronously rotating with the double-hole metal pull rods 9 and the main reduction gear 3, so that the stability of the phase positions are ensured. Therefore, the four washout holes 20 of the main reduction gear 3 are provided with function of a washout device, thus the conventional independent washout device can be replaced. In addition, the shift from exposing the internally installed configuration of the swashplate module 5 to the outside can effectively shorten the length of the main rotor shaft 2. A position of the main reduction gear 3 is raised from the end of the main rotor shaft 2 to above the body frame. All of these measures will enhance the flying stability of the model helicopter.

The washout main reduction gear and the internally installed swashplate module of the present invention not only fulfill the normal functional requirement of the remote-controlled mode helicopter, but also eliminates components such as the metal retaining ring, the swashplate guide board, and the washout device at the base of the conventional structure. Therefore, the manufacturing costs of the model helicopter are reduced. At the same time, the number of the exposing components is reduced, so that the appearance of the model helicopter is more neatly clean and more like a real helicopter.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A transmission mechanism for a remote-controlled model simulation helicopter, comprising:

a body frame, wherein said body frame is orderly provided with a main rotor holder, a main rotor shaft, and a main reduction gear, wherein said main reduction gear is provided with a plurality of washout holes which are evenly distributed about an axis thereof, wherein said body frame is provided with a swashplate module and a servo arrangement at a middle portion thereof, wherein said swashplate module comprises an outer tray and an inner tray, wherein said outer tray of said swashplate module is provided with three outer ball heads which are triangularly distributed, wherein said inner tray of said swashplate module is provided with four symmetrically distributed inner ball heads, wherein said servo arrangement comprises a first servo, a second servo, and a third servo which are arranged in a same plane and are triangularly distributed, wherein said body frame is respectively provided with at least one double-hole metal pull rod, at least one double-hole plastic connecting rod, and at least one servo rocker arm, wherein said swashplate module is provided at a lower end of main rotor shaft within said body frame, wherein said outer ball heads on said outer tray of said swashplate module are respectively coupled with said first servo, said second servo, and said third servo which are triangularly distributed, wherein said double plastic connecting rod has two ball head holds respectively engaged with a rocker arm ball head of said servo rocker arm and said outer ball head on said outer tray of said swashplate module, wherein said double-hole metal pull rod comprises a metal pull rod portion passing through said washout holes of said main reduction gear, a lower connecting rod head connected to said inner ball head of said inner tray of said swashplate module, and an upper connecting rod head connected to a ball head of said main rotor holder.

2. The transmission mechanism for a remote-controlled model simulation helicopter, as recited in claim 1, further having a recess formed between said second servo and said third servo, wherein said swashplate module further comprises a guide rod installed into said recess.

3. A transmission mechanism for a remote-controlled model simulation helicopter, comprising:

a body frame, wherein said body frame is orderly provided with a main rotor holder, a main rotor shaft, and a main reduction gear, wherein said main reduction gear is provided with a plurality of washout holes which are evenly distributed about an axis thereof, wherein said body frame is provided with a swashplate module and a servo arrangement at a middle portion thereof, wherein said swashplate module comprises an outer tray and an inner tray, wherein said outer tray of said swashplate module is provided with three outer ball heads which are triangularly distributed, wherein said inner tray of said swashplate module is provided with four symmetrically distributed inner ball heads, wherein said servo arrangement comprises a first servo, a second servo, and a third servo which are arranged in a same plane and are triangularly distributed, wherein said body frame is respectively provided with at least one double-hole metal pull rod , at least one double-hole plastic connecting rod, and at least one servo rocker arm, wherein said main reduction gear is provided with at least one bolt hole and a central hole, wherein said main rotor shaft is provided with at least one through hole, wherein said main rotor shaft passes through said central hole of said main reduction gear, wherein said transmission mechanism further comprises a retaining bolt which mounts said main rotor gear with said main rotor shaft through said bolt hole and said through hole, wherein said main reduction gear further comprises a cylindrical wall engaged with an inner surface of a bearing, wherein said main rotor shaft is engaged with said bearing, wherein said cylindrical wall further comprises a stepped surface that is engaged with an upper end surface of said bearing, wherein said transmission mechanism further comprises four bolt columns provided below said main reduction gear, and at least one self-tapping screw, wherein said self-tapping screw is firmly locked so as to retain said main reduction gear on said body frame, wherein said swashplate module is provided at a lower end of main rotor shaft within said body frame, wherein said outer ball heads on said outer tray of said swashplate module are respectively coupled with said first servo, said second servo, and said third servo which are triangularly distributed, wherein said double plastic connecting rod has two ball head holds respectively engaged with a rocker arm ball head of said servo rocker arm and said outer ball head on said outer tray of said swashplate module, wherein said double-hole metal pull rod comprises a metal pull rod portion passing through said washout holes of said main reduction gear, a lower connecting rod head connected to said inner ball head of said inner tray of said swashplate module, and an upper connecting rod head connected to a ball head of said main rotor holder.

4. The transmission mechanism for a remote-controlled model simulation helicopter, as recited in claim 3, further having a recess formed between said second servo and said third servo, wherein said swashplate module further comprises a guide rod installed into said recess.

* * * * *